US012115637B2

(12) United States Patent
Fünfer et al.

(10) Patent No.: US 12,115,637 B2
(45) Date of Patent: Oct. 15, 2024

(54) IMPACT MECHANISM ARRANGEMENT

(71) Applicant: Hilti Aktiengesellschaft, Schaan (LI)

(72) Inventors: Josef Fünfer, Koenigsbrunn (DE); Ulrich Mandel, Buchloe Honsolgen (DE)

(73) Assignee: Hilti Aktiengesellschaft, Schaan (LI)

( * ) Notice: Subject to any disclaimer, the term of this patent is extended or adjusted under 35 U.S.C. 154(b) by 39 days.

(21) Appl. No.: 17/771,658

(22) PCT Filed: Nov. 6, 2020

(86) PCT No.: PCT/EP2020/081267
§ 371 (c)(1),
(2) Date: Apr. 25, 2022

(87) PCT Pub. No.: WO2021/094214
PCT Pub. Date: May 20, 2021

(65) Prior Publication Data

US 2022/0362916 A1 Nov. 17, 2022

(30) Foreign Application Priority Data

Nov. 15, 2019 (EP) .................................... 19209451

(51) Int. Cl.
*B25D 11/06* (2006.01)
*B25D 11/10* (2006.01)
(Continued)

(52) U.S. Cl.
CPC ............. *B25D 17/24* (2013.01); *B25D 17/06* (2013.01); *B25D 2217/0015* (2013.01);
(Continued)

(58) Field of Classification Search
CPC ............................... B25D 17/06; B25D 17/24; B25D 2217/0015; B25D 2217/0019; B25D 2250/121; B25D 2250/131
See application file for complete search history.

(56) References Cited

U.S. PATENT DOCUMENTS 1,873,173 A * 8/1932 Anderson .............. B25D 17/24 279/158
2,685,274 A 8/1954 Liddicoat
(Continued)

FOREIGN PATENT DOCUMENTS

CH 659792 A5 2/1987
CN 1042215 A 5/1990
(Continued)

OTHER PUBLICATIONS

International Search Report of PCT/EP2020/081266, Feb. 8, 2021.
International Search Report of PCT/EP2020/081267, Feb. 8, 2021.

*Primary Examiner* — Thomas M Wittenschlaeger
*Assistant Examiner* — David G Shutty
(74) *Attorney, Agent, or Firm* — Davidson Kappel LLC

(57) ABSTRACT

Hammer drill and/or chipping hammer (100) having a drive motor (70), an impact mechanism (10) and a tool fitting (50) for fitting a tool (110), wherein the impact mechanism (10) has an anvil (30) that is axially displaceable in an anvil guide (20) and acts on the tool (110), wherein the impact mechanism (10) has an idle-strike damper element (11), which acts between the anvil (30) and the tool fitting (50), and wherein the impact mechanism has a guide housing (80), which engages at least partially around the anvil (30) and/or the tool fitting (50), wherein an additional idle-strike damper element (31) is provided, which acts between the tool fitting (50) and the guide housing (80).

20 Claims, 2 Drawing Sheets

(51) Int. Cl.
*B25D 16/00* (2006.01)
*B25D 17/06* (2006.01)
*B25D 17/24* (2006.01)

(52) U.S. Cl.
CPC ................ *B25D 2217/0019* (2013.01); *B25D 2250/121* (2013.01); *B25D 2250/131* (2013.01)

(56) References Cited

U.S. PATENT DOCUMENTS

| | | | | | |
|---|---|---|---|---|---|
| 2,875,731 | A * | 3/1959 | Settles | B25D 17/24 | 188/380 |
| 3,507,337 | A * | 4/1970 | Franz | B25D 16/006 | 173/48 |
| 3,828,863 | A * | 8/1974 | Bleicher | B25D 16/006 | 173/48 |
| 3,939,923 | A * | 2/1976 | Aldag | B25D 17/24 | 173/162.1 |
| 4,064,949 | A * | 12/1977 | Chromy | B25D 16/00 | 173/14 |
| 4,442,906 | A * | 4/1984 | Simpson | B25D 11/005 | 173/133 |
| 4,476,941 | A * | 10/1984 | Buck | B25D 17/06 | 173/133 |
| 4,585,077 | A * | 4/1986 | Bergler | B23B 31/1238 | 279/19 |
| 4,798,249 | A * | 1/1989 | Hoereth | B25D 11/005 | 173/200 |
| 5,050,687 | A | 9/1991 | Prokhorov et al. | | |
| 5,199,833 | A * | 4/1993 | Fehrle | B25D 17/088 | 408/239 R |
| 5,573,075 | A * | 11/1996 | Henry | B25D 17/24 | 173/162.1 |
| 6,675,908 | B1 * | 1/2004 | Frauhammer | B25D 11/125 | 173/137 |
| 6,732,815 | B2 * | 5/2004 | Hanke | B25D 17/20 | 173/210 |
| 7,013,986 | B2 * | 3/2006 | Mikiya | B25F 5/006 | 173/51 |
| 7,445,054 | B2 * | 11/2008 | Heep | B25D 17/06 | 173/217 |
| 7,523,791 | B2 * | 4/2009 | Aoki | B25D 16/00 | 173/206 |
| 7,588,097 | B2 * | 9/2009 | Kamegai | B25D 11/062 | 173/217 |
| 7,806,201 | B2 * | 10/2010 | Aoki | B23D 51/16 | 173/210 |
| 7,878,265 | B2 * | 2/2011 | Aoki | B25D 17/06 | 173/210 |
| 7,950,471 | B2 * | 5/2011 | Loeffler | B25D 11/005 | 173/104 |
| 8,087,472 | B2 * | 1/2012 | Usselman | B25D 17/24 | 173/217 |
| 8,272,453 | B2 * | 9/2012 | Ullrich | B25D 17/06 | 173/133 |
| 8,720,599 | B2 * | 5/2014 | Ikuta | B25D 17/24 | 173/164 |
| 8,991,517 | B2 * | 3/2015 | Sugiyama | B25D 17/24 | 173/211 |
| 9,272,408 | B2 * | 3/2016 | Koch | B25D 17/24 | |
| 9,321,163 | B2 * | 4/2016 | Onoda | B25D 11/062 | |
| 9,656,378 | B2 * | 5/2017 | Hartmann | B25D 17/06 | |
| 9,724,814 | B2 * | 8/2017 | Yoshikane | B25D 17/24 | |
| 9,962,823 | B2 * | 5/2018 | Machida | B25F 5/006 | |
| 2005/0269117 | A1 | 12/2005 | Sato et al. | | |
| 2008/0217040 | A1 | 9/2008 | Loeffler et al. | | |
| 2008/0245220 | A1 * | 10/2008 | Duesselberg | B25D 17/24 | 91/234 |
| 2010/0038104 | A1 * | 2/2010 | Baumann | B25D 16/003 | 173/162.1 |
| 2016/0311103 | A1 * | 10/2016 | Wiedner | B25D 17/245 | |
| 2019/0308308 | A1 * | 10/2019 | Mayr | B25D 17/24 | |

FOREIGN PATENT DOCUMENTS

| | | | |
|---|---|---|---|
| CN | 1706598 | A | 12/2005 |
| CN | 102862149 | A | 1/2013 |
| EP | 0663270 | A1 | 7/1995 |
| EP | 1238759 | A1 | 9/2002 |
| EP | 1479485 | A1 | 11/2004 |
| EP | 2199031 | A1 | 6/2010 |
| EP | 2314420 | A1 | 4/2011 |
| GB | 618546 | A | 2/1949 |
| WO | WO 2009036526 | A1 | 3/2009 |
| WO | WO 2010082871 | A1 | 7/2010 |
| WO | WO 2013029855 | A1 | 3/2013 |
| WO | WO 2015/000129 | A1 | 1/2015 |
| WO | WO 2021/094213 | A1 | 5/2021 |
| WO | WO 2021/094214 | A1 | 5/2021 |

* cited by examiner

IMPACT MECHANISM ARRANGEMENT

The present invention relates to a hammer drill and/or chipping hammer having a drive motor, an impact mechanism and a tool fitting for fitting a tool. The impact mechanism has an anvil that is axially displaceable in an anvil guide and acts on the tool. The impact mechanism is equipped with an idle-strike damper element, which acts between the anvil and the tool fitting. The impact mechanism has a guide housing, which engages at least partially around the anvil and/or the tool fitting.

BACKGROUND

Hammer drills and/or chipping hammers of the type mentioned at the beginning are known in principle from the prior art.

Idle-strike damper elements and rebound-strike damper elements, which are preferably in the form of elastomer damping elements, are used in order to keep force peaks on downstream components and vibrations as low as possible. When the impact mechanism is at the working point, the anvil butts, after each strike, against a typically provided rebound-strike disk and this is absorbed by the rebound-strike damping element.

SUMMARY OF THE INVENTION

In the event of too low a pressing force or the breaking away of concrete/stone to be worked on, idle strikes can occur. This means that strikes with full impact energy have to be absorbed by the hammer and in particular the tool fitting itself. In order to protect the downstream components from a force peak of the idle strike, use is typically made of an idle-strike damping element. Idle-strike damping by the idle-strike damper element influences the return speed of the anvil after an idle strike and thus also the deactivation behavior of the hammer.

It is an object of the present invention to provide a hammer drill and/or chipping hammer in which a load on the tool fitting is comparatively reduced.

The present disclosure provides an additional idle-strike damper element, which acts between the tool fitting and the guide housing. The invention has the advantage that a comparatively low anvil return speed can be achieved by two damping elements working against one another. While the idle-strike damper element rebounds during a return movement of the anvil, i.e. after an idle strike, the additional idle-strike damper element that acts between the tool fitting and the guide housing is compressed, and so the anvil is accelerated back only to a comparatively minor extent. This results in turn in a comparatively reduced load on the tool fitting.

In a particularly preferred embodiment, the tool fitting is movable in the axial direction relative to the guide housing and/or is arranged at least partially within the guide housing. It has been found to be advantageous if the impact mechanism has a rebound-strike damper element and an additional rebound-strike damper element. The rebound-strike damper element acts preferably between the anvil and the guide housing. It has been found to be advantageous if the additional rebound-strike damper element is arranged so as to act between the tool fitting and the guide housing. As a result of cooperation of the additional idle-strike damper element and additional rebound-strike damper element, it is possible for the tool fitting to be mounted in a floating manner, with the result that a not inconsiderable part of the impact energy of the anvil can already be attenuated.

It has been found to be advantageous if the additional idle-strike damper element and/or the additional rebound-strike damper element is/are spaced further apart from the anvil in the radial direction than the idle-strike damper element and/or the rebound-strike damper element. With respect to the guide housing, the additional idle-strike damper element can be supported in the axial direction by a guide bearing.

In a particularly preferred embodiment, force introduction from the tool fitting into the unit made up of the additional idle-strike damper element and additional rebound-strike damper element takes place by way of a ring or peg protruding in a radial direction from the tool fitting. It has been found to be advantageous if the ring or peg engages, with respect to the axial direction of the anvil, between the additional idle-strike damper element and additional rebound-strike damper element. The ring or peg can be clamped in place in the axial direction between the additional idle-strike damper element and the additional rebound-strike damper element.

In a particularly preferred embodiment, the anvil is assigned a contact piece, which is arranged so as to make contact with an idle-strike stop surface on one side and to make contact with a rebound-strike stop surface on the other side. It has been found to be advantageous if the idle-strike stop surface is formed on an idle-strike stop ring comprised by the tool fitting and/or the rebound-strike stop surface is formed on a rebound-strike stop ring comprised by the tool fitting.

In a particularly preferred embodiment, the impact mechanism has an idle-strike wedge ring and/or a rebound-strike wedge ring. The idle-strike wedge ring can be arranged between a first bearing of the anvil guide and the idle-strike damper element. It has been found to be advantageous if the rebound-strike wedge ring is arranged between a second bearing of the anvil guide and the rebound-strike damper element. The first and/or the second bearing can be in the form of a plain bearing or of a rolling bearing.

In a particularly preferred embodiment, the idle-strike wedge ring is supported on its side facing away from the idle-strike damper element and in the axial direction only against the first bearing. The rebound-strike wedge ring can be supported on its side facing away from the rebound-strike damper element and in the axial direction only against the second bearing.

In a particularly preferred embodiment, the contact piece is formed separately from the anvil. The contact piece can advantageously be clamped in place resiliently in the axial direction between the idle-strike damper element and the rebound-strike damper element. It has been found to be advantageous if the contact piece is movable in the axial direction relative to the anvil. In a particularly preferred embodiment, the anvil has a channel extending in the axial direction. Particularly preferably, the contact piece is permanently engaged with the channel.

As an alternative to the contact piece being formed separately from the anvil, the contact piece can be formed in one piece with the anvil. It has been found to be advantageous if the idle-strike damper element, the rebound-strike damper element, the additional idle-strike damper element and/or the additional rebound-strike damper element are in the form of elastomer bodies.

Further advantages will become apparent from the following description of the figures. Various exemplary embodiments of the present invention are shown in the figures. The figures, the description and the claims contain numerous features in combination. A person skilled in the art will expediently also consider the features individually and combine them to form useful further combinations.

BRIEF DESCRIPTION OF THE DRAWINGS

In the figures, identical and similar components are denoted by the same reference signs. In the figures.

DETAILED DESCRIPTION

Figure 1:
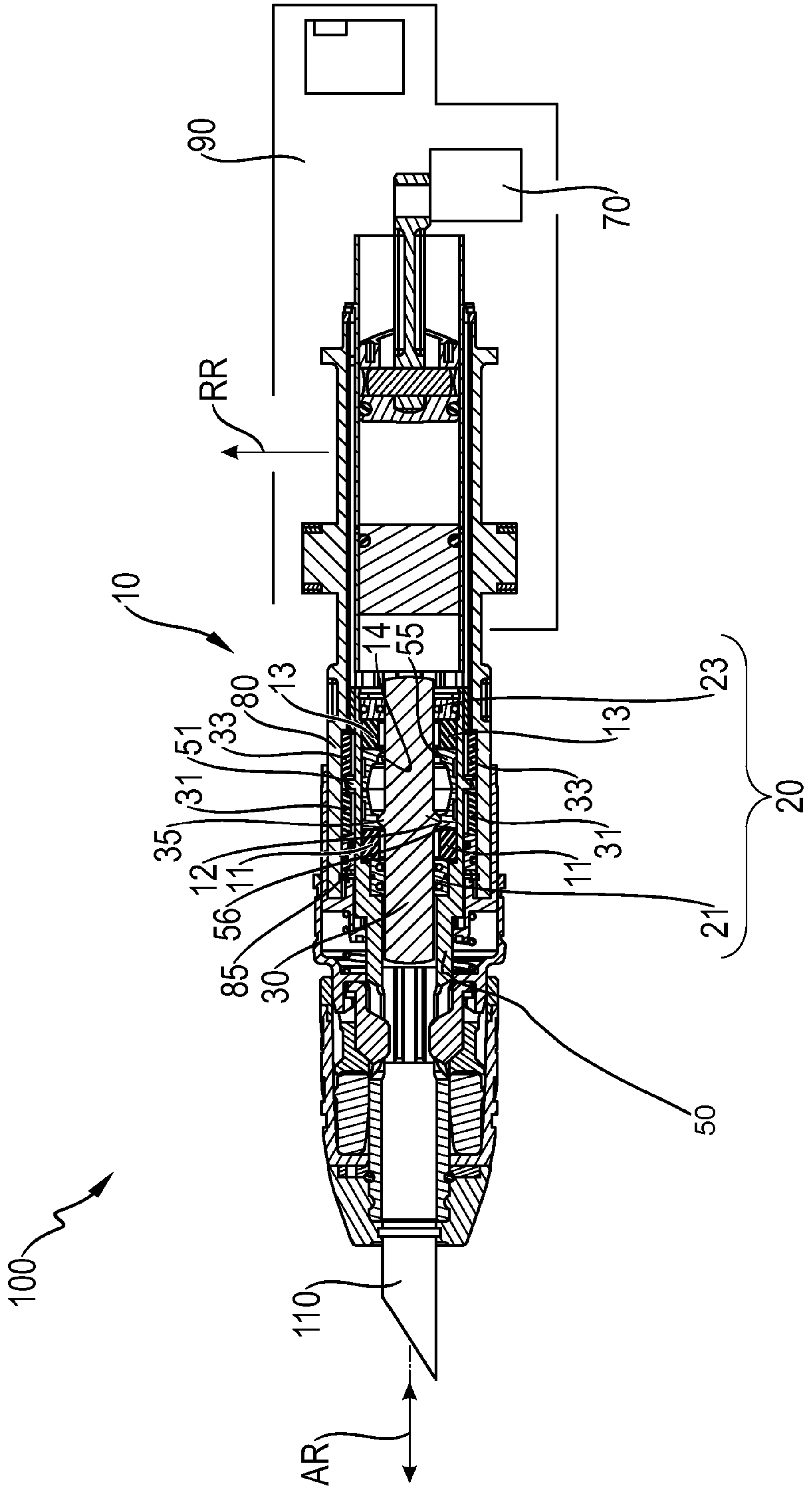
FIG. 1 shows a preferred exemplary embodiment of a hammer drill and/or chipping hammer according to the invention.

A preferred exemplary embodiment of a hammer drill and/or chipping hammer 100 according to the invention is illustrated in FIG. 1. The hammer drill and/or chipping hammer 100 is equipped with a drive motor 70, an impact mechanism 10 and a tool fitting 50 for fitting a tool 110. The impact mechanism 10 and the drive motor 70 are arranged within a housing 90 of the hammer drill and/or chipping hammer 100.

The impact mechanism 10 has an anvil 30 that is displaceable in the axial direction AR in an anvil guide 20 and acts on the tool 110. The anvil guide 20 is realized by a first bearing 21 and a second bearing 23 (in the form for example of a rolling bearing here), which are respectively supported both in a radial direction RR and in the axial direction AR against the tool fitting 50.

The impact mechanism 10 has an idle-strike damper element 11, which acts between the anvil 30 and the tool fitting 50 (via the idle-strike stop ring 56). The impact mechanism 10 also has a guide housing 80, which engages at least partially around the anvil 30 and the tool fitting 50. According to the invention, an additional idle-strike damper element 31 is provided, which acts between the tool fitting 50 and the guide housing 80. The tool fitting 50 is movable in the axial direction AR relative to the guide housing 80 and is arranged at least partially within the guide housing 80. If the tool fitting 50 moves further out of the guide housing 80 in the axial direction AR, i.e. to the left in FIG. 1, the resilient additional idle-strike damper element 31 is compressed.

As is likewise apparent from FIG. 1, the impact mechanism 10 is equipped with a resilient rebound-strike damper element 13 and a resilient additional rebound-strike damper element 33. In this case, the rebound-strike damper element 13 acts between the anvil 30 and the guide housing 50, via the rebound-strike stop ring 55. The additional rebound-strike damper element 33 acts between the tool fitting 50 and the guide housing 80. In this case, force introduction from the tool fitting 50 into the unit made up of the additional idle-strike damper element 31 and additional rebound-strike damper element 33 takes place by way of a ring 51 protruding in a radial direction RR from the tool fitting. If the tool fitting 50 moves further into the guide housing 80 in the axial direction AR, i.e. to the right in FIG. 1, the resilient additional idle-strike damper element 31 is relieved of load and the additional rebound-strike damper element 33 is compressed. The ring 51 can be clamped in place in the axial direction AR between the additional idle-strike damper element 31 and the additional rebound-strike damper element 33. As is apparent from FIG. 1, the ring 51 engages, with respect to the axial direction AR, between the additional idle-strike damper element 31 and additional rebound-strike damper element 33.

The anvil 30 is assigned a contact piece 35, which is arranged so as to make contact with an idle-strike stop surface 12 on one side and to make contact with a rebound-strike stop surface 14 on the other side. In the exemplary embodiment in FIG. 1, the contact piece 35 is formed in one piece with the anvil 30. The idle-strike stop surface 12 is formed in the present case on the idle-strike stop ring 56 comprised by the tool fitting 50. The rebound-strike stop surface 14 is in turn formed on the rebound-strike stop ring 55 comprised by the tool fitting 50.

Figure 2:
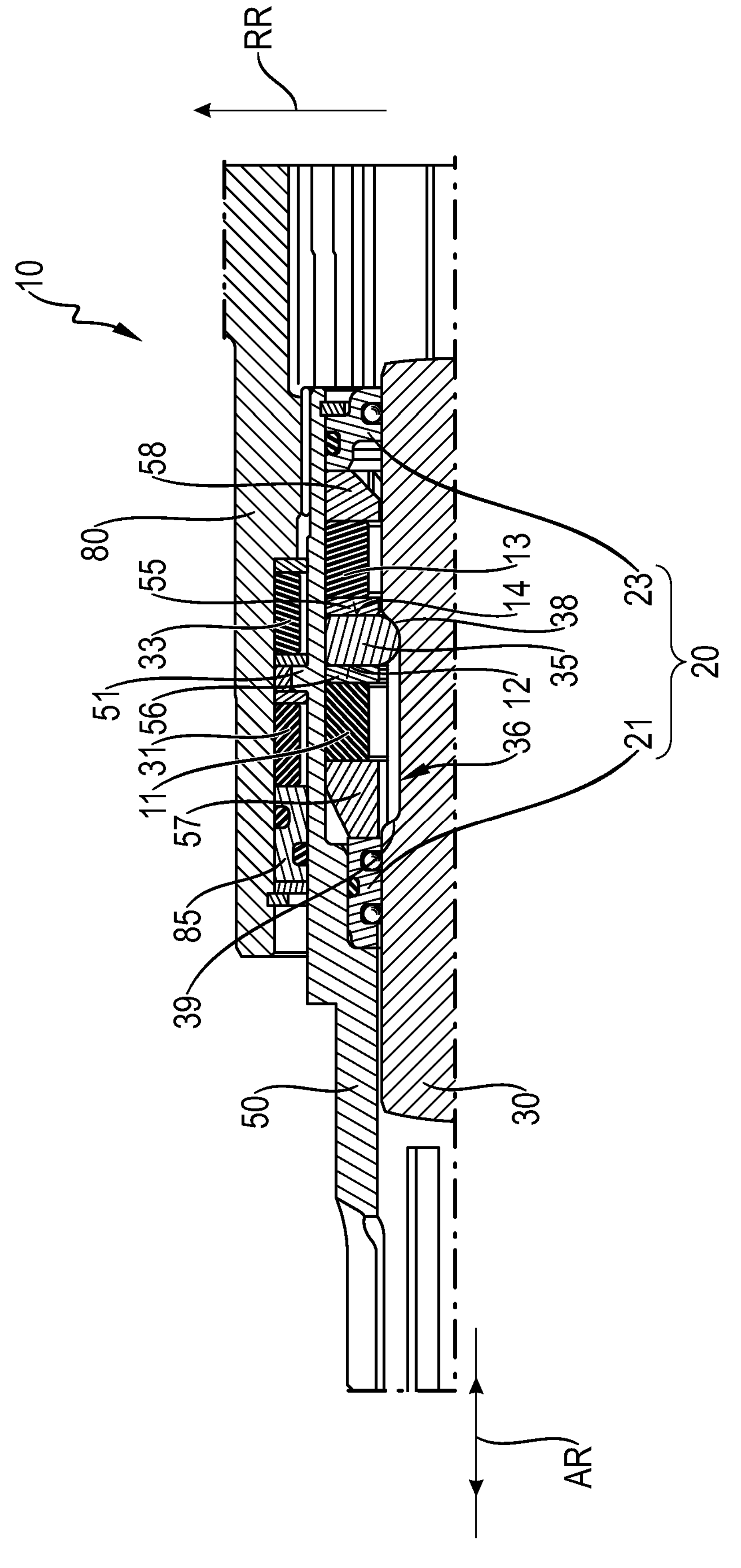
FIG. 2 shows a preferred exemplary embodiment of an impact mechanism.

A further preferred exemplary embodiment of an impact mechanism 10 is illustrated in FIG. 2. The impact mechanism 10 has an anvil 30 that is displaceable in the axial direction AR in an anvil guide 20. The anvil guide 20 is realized by a first bearing 21 and a second bearing 23 (in the form for example of a rolling bearing here), which are respectively supported both in a radial direction RR and in the axial direction AR against the tool fitting 50.

In contrast to the exemplary embodiment shown in FIG. 1, in the exemplary embodiment in FIG. 2, the contact piece 35 is formed separately from the anvil 30. The anvil 30 has a channel 37 extending in the axial direction AR, in which the contact piece 35 can slide in the axial direction AR. As is apparent from FIG. 2, the contact piece 35 is movable both with respect to the anvil 30 and with respect to the tool fitting 50, in each case as seen in the axial direction AR. The contact piece 35 is permanently engaged with the channel 37.

In the state shown in FIG. 2, i.e. during an idle strike, the contact piece 35 is in contact with the right-hand stop 38 of the channel, or strikes said stop (the anvil 30 in FIG. 2 moves to the left). During a rebound strike (not illustrated here), the contact piece 35 is in turn in contact with the left-hand stop 39 of the channel 36, or strikes said stop (the anvil 30 in FIG. 2 moves to the right).

The impact mechanism in FIG. 2 has an idle-strike damper element 11, which, via an idle-strike wedge ring 57 and a first bearing 21 on one side and via the idle-strike stop ring 56 and the contact piece 35 on the other side, acts between the anvil 30 and the tool fitting 50. Furthermore, a rebound-strike damper element 13 is provided, which, via a rebound-strike wedge ring 58 and a second bearing 21 on one side and via the rebound-strike stop ring 55 and the contact piece 35 on the other side, acts between the anvil 30 and the guide housing 50.

As is apparent from FIG. 2, the idle-strike wedge ring 57 is arranged between the first bearing 21 of the anvil guide 20 and the idle-strike damper element 11. The rebound-strike wedge ring 58 is arranged between the second bearing 23 of the anvil guide 20 and the rebound-strike damper element 13. In this case, the idle-strike wedge ring 57 is supported on its side facing away from the idle-strike damper element 11 and in the axial direction AR only against the first bearing 21. The rebound-strike wedge ring 58 is supported on its side facing away from the rebound-strike damper element 13 and in the axial direction only against the second bearing 23.

The contact piece 35 separate from the anvil 30 is clamped in place resiliently in the axial direction AR between the idle-strike damper element 11 and the rebound-strike damper element 13. In this regard, during operation of the impact mechanism 10, "conventional" striking of the contact piece 35 against the idle-strike stop ring 56 or the rebound-strike stop ring 55 does not occur.

As in the exemplary embodiment in FIG. 1, in the exemplary embodiment in FIG. 2, too, an additional idle-strike damper element 31 is provided, which acts between the tool fitting 50 and the guide housing 80. With respect to the guide housing 80, the additional idle-strike damper element 31 is supported in the axial direction AR by a guide bearing 85.

As is likewise apparent from FIG. 2, the impact mechanism 10 is equipped with a resilient rebound-strike damper element 13 and a resilient additional rebound-strike damper element 33. In this case, the rebound-strike damper element 13 acts between the anvil 30 and the guide housing 50, via the rebound-strike stop ring 55, the rebound-strike wedge ring 58 and the contact piece 35. The additional rebound-strike damper element 33 acts between the tool fitting 50 and the guide housing 80. In this case, force introduction from the tool fitting 50 into the unit made up of the additional idle-strike damper element 31 and additional rebound-strike damper element 33 takes place by way of a ring 51 protruding in a radial direction RR from the tool fitting.

As a result of cooperation of the additional idle-strike damper element 31 and additional rebound-strike damper element 33, in this exemplary embodiment, too, the tool fitting 50 is mounted in a floating manner, with the result that a not inconsiderable part of the impact energy of the anvil 30 can already be attenuated.

LIST OF REFERENCE SIGNS

10 Impact mechanism
11 Idle-strike damper element
12 Idle-strike stop surface
13 Rebound-strike damper element
14 Rebound-strike stop surface
20 Anvil guide
21, 23 Rolling bearing
30 Anvil
31 Additional idle-strike damper element
33 Additional rebound-strike damper element
35 Contact piece
36 Channel
38 Right-hand channel stop
39 Left-hand channel stop
50 Tool fitting
51 Ring
55 Rebound-strike stop ring
56 Idle-strike stop ring
57 Idle-strike wedge ring
58 Rebound-strike wedge ring
70 Drive motor
80 Guide housing
85 Guide bearing
90 Housing
100 Hammer drill and/or chipping hammer
110 Tool
AR Axial direction
RR Radial direction

What is claimed is:

1. A hammer drill or chipping hammer comprising:

a drive motor;

an impact mechanism; and a tool fitting for fitting a tool, wherein the impact mechanism has an anvil axially displaceable in an anvil guide and acting on the tool, wherein the impact mechanism has an idle-strike damper element acting between the anvil and the tool fitting and the impact mechanism has a guide housing engaging at least partially around the anvil or the tool fitting;

an additional idle-strike damper element acting between the tool fitting and the guide housing;

wherein the anvil is assigned a contact piece arranged so as to make contact with an idle-strike stop surface on one side and to make contact with a rebound-strike stop surface on an other side; and wherein the contact piece is formed separately from the anvil and is clamped in place resiliently in an axial direction between the idle-strike damper element and a rebound-strike damper element.

2. The hammer drill or chipping hammer as recited in claim 1 wherein the tool fitting is movable in the axial direction relative to the guide housing or is arranged at least partially within the guide housing.

3. The hammer drill or chipping hammer as recited in claim 1 wherein the impact mechanism has the rebound-strike damper element and an additional rebound-strike damper element, wherein the rebound-strike damper element acts between the anvil and the guide housing and the additional rebound-strike damper element acts between the tool fitting and the guide housing.

4. The hammer drill or chipping hammer as recited in claim 3 wherein the idle-strike damper element, the rebound-strike damper element, the additional idle-strike damper element and the additional rebound-strike damper element are elastomer bodies.

5. The hammer drill or chipping hammer as recited in claim 3 further comprising a ring protruding in a radial direction from the tool fitting, wherein force introduction from the tool fitting into a unit made up of the additional idle-strike damper element and the additional rebound-strike damper element takes place by way of the ring.

6. The hammer drill or chipping hammer as recited in claim 5 wherein the ring engages, with respect to the axial direction, between the additional idle-strike damper element and the additional rebound-strike damper element.

7. The hammer drill or chipping hammer as recited in claim 1 wherein the idle-strike stop surface is formed on an idle-strike stop ring comprised by the tool fitting or the rebound-strike stop surface is formed on a rebound-strike stop ring comprised by the tool fitting.

8. The hammer drill or chipping hammer as recited in claim 7 wherein the impact mechanism has an idle-strike wedge ring and a rebound-strike wedge ring, wherein the idle-strike wedge ring is arranged between a first bearing of the anvil guide and the idle-strike damper element and the rebound-strike wedge ring is arranged between a second bearing of the anvil guide and the rebound-strike damper element.

9. The hammer drill or chipping hammer as recited in claim 8 wherein the idle-strike wedge ring is supported on a side facing away from the idle-strike damper element and in the axial direction only against the first bearing or the rebound-strike wedge ring is supported on a side facing away from the rebound-strike damper element and in the axial direction only against the second bearing.

10. The hammer drill or chipping hammer as recited in claim 1 wherein the contact piece is movable in the axial direction relative to the anvil.

11. The hammer drill or chipping hammer as recited in claim 10 wherein the anvil has a channel extending in the axial direction, the contact piece being permanently engaged with the channel.

12. A hammer drill or chipping hammer comprising:

a drive motor;

an impact mechanism; and a tool fitting for fitting a tool, wherein the impact mechanism has an anvil axially displaceable in an anvil guide and acting on the tool, wherein the impact mechanism has an idle-strike damper element acting between the anvil and the tool fitting and the impact mechanism has a guide housing engaging at least partially around the anvil or the tool fitting;

an additional idle-strike damper element acting between the tool fitting and the guide housing;

wherein the anvil is assigned a contact piece arranged so as to make contact with an idle-strike stop surface on one side and to make contact with a rebound-strike stop surface on an other side;

wherein the idle-strike stop surface is formed on an idle-strike stop ring comprised by the tool fitting or the rebound-strike stop surface is formed on a rebound-strike stop ring comprised by the tool fitting;

wherein the impact mechanism has an idle-strike wedge ring and a rebound-strike wedge ring, wherein the idle-strike wedge ring is arranged between a first bearing of the anvil guide and the idle-strike damper element and the rebound-strike wedge ring is arranged between a second bearing of the anvil guide and a rebound-strike damper element.

13. The hammer drill or chipping hammer as recited in claim 12 wherein the idle-strike wedge ring is supported on a side facing away from the idle-strike damper element and in an axial direction only against the first bearing or the rebound-strike wedge ring is supported on a side facing away from the rebound-strike damper element and in the axial direction only against the second bearing.

14. The hammer drill or chipping hammer as recited in claim 12 wherein the tool fitting is movable in an axial direction relative to the guide housing or is arranged at least partially within the guide housing.

15. The hammer drill or chipping hammer as recited in claim 12 wherein the impact mechanism has the rebound-strike damper element and an additional rebound-strike damper element, wherein the rebound-strike damper element acts between the anvil and the guide housing and the additional rebound-strike damper element acts between the tool fitting and the guide housing.

16. The hammer drill or chipping hammer as recited in claim 15 wherein the idle-strike damper element, the rebound-strike damper element, the additional idle-strike damper element and the additional rebound-strike damper element are elastomer bodies.

17. The hammer drill or chipping hammer as recited in claim 15 further comprising a ring protruding in a radial direction from the tool fitting, wherein force introduction from the tool fitting into a unit made up of the additional idle-strike damper element and the additional rebound-strike damper element takes place by way of the ring.

18. The hammer drill or chipping hammer as recited in claim 17 wherein the ring engages, with respect to the axial direction, between the additional idle-strike damper element and the additional rebound-strike damper element.

19. The hammer drill or chipping hammer as recited in claim 12 wherein the contact piece is movable in an axial direction relative to the anvil.

20. The hammer drill or chipping hammer as recited in claim 19 wherein the anvil has a channel extending in the axial direction, the contact piece being permanently engaged with the channel.

* * * * *